(No Model.)
U. P. SAWYER.
SEED CONVEYER.
No. 359,635. Patented Mar. 22, 1887.
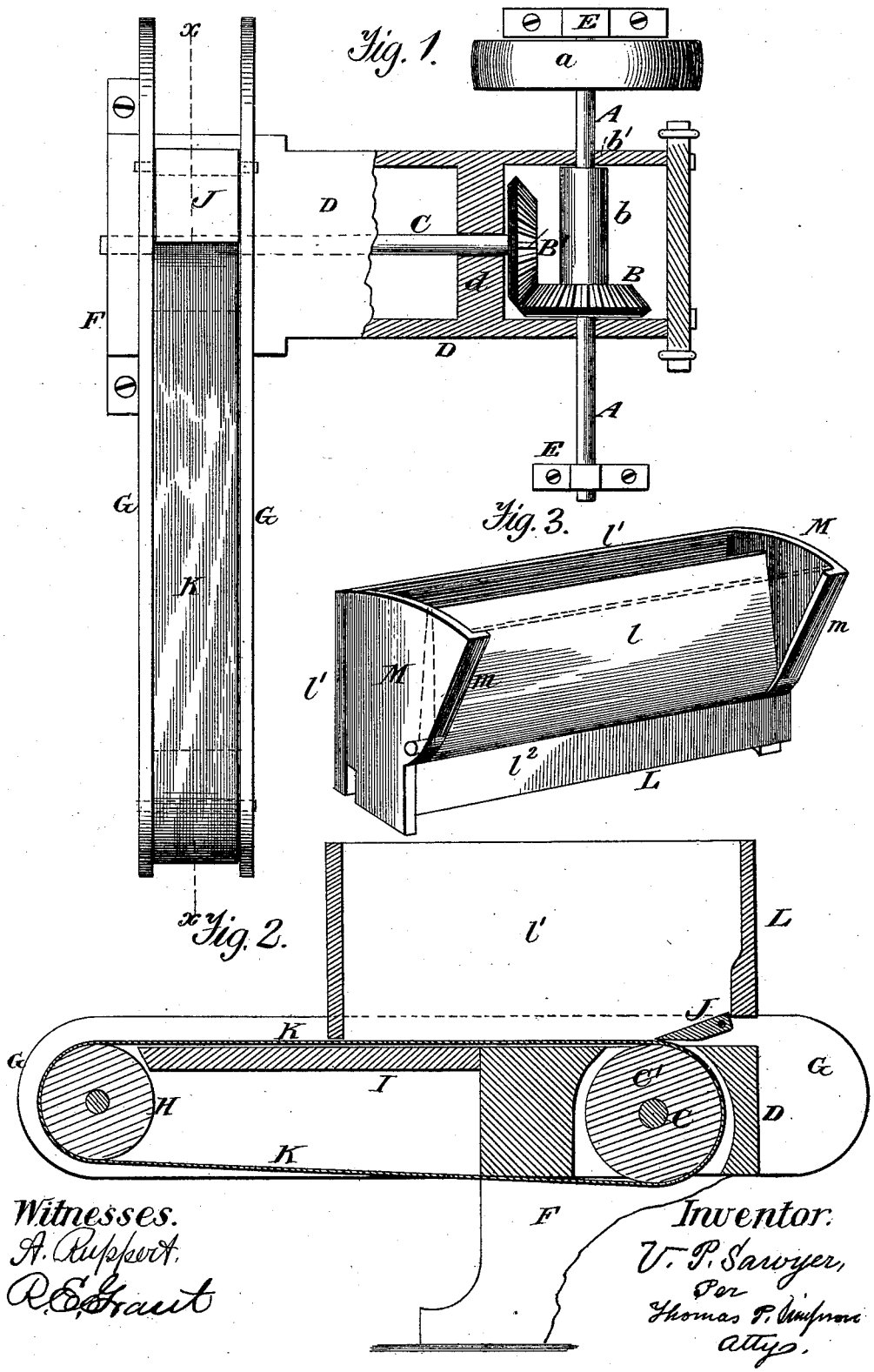

United States Patent Office.

URIAH PAGE SAWYER, OF CAMILLA, GEORGIA.

SEED-CONVEYER.

SPECIFICATION forming part of Letters Patent No. 359,635, dated March 22, 1887.

Application filed July 30, 1886. Serial No. 209,523. (No model.)

*To all whom it may concern:*

Be it known that I, URIAH PAGE SAWYER, a citizen of the United States, residing at Camilla, in the county of Mitchell and State of Georgia, have invented certain new and useful Improvements in Seed-Conveyers for Cotton-Gins; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will first be described in connection with the drawings, and then pointed out in the claims.

Figure 1 of the drawings is a horizontal section; Fig. 2, a vertical section on line $x\ x$ of Fig. 1, and Fig. 3 a detail view in perspective of the hopper.

In the drawings, A represents the main shaft, having the drive-pulley $a$. This shaft is connected by the bevel gear-wheels B B' with a counter-shaft, C, carrying the end pulley, C'.

D is the frame; E E, uprights in which the shaft A is journaled, and F the upright in which the pulley end of shaft C is provided with a bearing, the other end being journaled in a cross-piece, $d$.

G G are two parallel plates or boards at right angles to the frame D, securely bolted together at the desired distance apart, provided with the intermediate pulley, H, near their ends, and the longitudinal board or plate I, leading from the top of one pulley to the frame D, being slightly below the highest points of said pulleys.

J is an inclined board down which the cotton-seed slides upon the endless carrier K, which is made to travel on the pulleys C' H.

L is the hopper, of which the inclined side $l$ is hinged at the bottom, so as to turn forward against the opposite side, $l'$, and back against the end flanges, $m\ m$. The ends M M are connected by the side $l'$ and the strip $l^2$.

My cotton-seed conveyer is arranged on the left side of the gin, and thus carries the seed to the left, being confined to the floor in any suitable manner.

The wheel B is provided with a sleeve, $b$, which extends to the opposite bearing, $b'$. By this construction the shaft A may be drawn out of said wheel and its shaft and the wheel reversed so as to gear with the opposite side of wheel B'. With this change, the conveyer may be arranged on the left of the gin, and the seed discharged on the right thereof.

The plates G G and the carrier K may be of any preferred length, so as to carry the seed for any desired distance. The hopper L receives the cotton-seed as it leaves the gin, the said seed dropping on the incline J and slides down upon the carrier K. The hinged side $l$ of the hopper is used for the purpose of preventing a roll of cotton which may be thrown out of gin from going into the hopper with the seed. This cannot occur when the side $l$ is turned down on the side $l'$.

The conveyer keeps all seed, dust, or lint from the gin and all obstructions from the machinery.

My invention is applicable to saw-mills for the purpose of carrying off the sawdust, and may be easily attached thereto.

Having thus described my invention, what I claim as new, and desire to protect by Letters Patent, is—

1. The hopper L of a cotton-seed conveyer made with the bottom-hinged side $l$, adapted to be used as and for the purpose specified.

2. The hopper of a cotton-seed conveyer, provided with the hinged incline J, arranged to bear yieldingly on the carrier-belt K, to receive the seed as it drops in the manner described.

In testimony whereof I affix my signature in presence of two witnesses.

URIAH PAGE SAWYER.

Witnesses:
 GEORGE W. SWINDLE,
 JOHN W. PEARCE.